United States Patent
Joch et al.

(10) Patent No.: US 7,400,681 B2
(45) Date of Patent: Jul. 15, 2008

(54) LOW-COMPLEXITY MOTION VECTOR PREDICTION FOR VIDEO CODEC WITH TWO LISTS OF REFERENCE PICTURES

(75) Inventors: Anthony Joch, Hamilton (CA); Faouzi Kossentini, Vancouver (CA)

(73) Assignee: Scientific-Atlanta, Inc., Lawrenceville, GA (US)

( * ) Notice: Subject to any disclaimer, the term of this patent is extended or adjusted under 35 U.S.C. 154(b) by 807 days.

(21) Appl. No.: 10/722,474

(22) Filed: Nov. 28, 2003

(65) Prior Publication Data

US 2005/0117646 A1    Jun. 2, 2005

(51) Int. Cl.
    *H04N 7/18* (2006.01)
(52) U.S. Cl. .............................. 375/240.16; 375/240.17
(58) Field of Classification Search ................................. 375/240.01–240.29
    See application file for complete search history.

(56) References Cited

U.S. PATENT DOCUMENTS

| | | | |
|---|---|---|---|
| 5,422,964 A | 6/1995 | Devimeux et al. | |
| 5,428,395 A | 6/1995 | Jeong | |
| 5,590,064 A | 12/1996 | Astle | |
| 5,608,652 A | 3/1997 | Astle | |
| 5,781,561 A | 7/1998 | Machida et al. | |
| 5,852,469 A | 12/1998 | Nagai et al. | |
| 6,014,095 A | 1/2000 | Yokoyama | |
| 6,414,608 B1 | 7/2002 | Nishida et al. | |
| 6,539,060 B1 | 3/2003 | Lee et al. | |
| 6,646,578 B1 | 11/2003 | Au | |
| 6,704,759 B2 | 3/2004 | Timko et al. | |
| 6,823,089 B1 | 11/2004 | Yu et al. | |
| 7,031,393 B2 | 4/2006 | Kondo et al. | |
| 2001/0033697 A1 | 10/2001 | Shimada | |
| 2002/0118399 A1 | 8/2002 | Estevex et al. | |
| 2004/0008784 A1* | 1/2004 | Kikuchi et al. | 375/240.16 |
| 2004/0032907 A1* | 2/2004 | Winger | 375/240.15 |
| 2004/0136461 A1* | 7/2004 | Kondo et al. | 375/240.16 |
| 2005/0013498 A1* | 1/2005 | Srinivasan et al. | 382/239 |
| 2005/0123282 A1* | 6/2005 | Novotny et al. | 386/111 |

OTHER PUBLICATIONS

"Joint Final Committee Draft (JFCD) of Joint Video Specification (ITU-T Rec. H.264 |ISO/IEC 14496-10 AVC)" by the Joint Video Team (JVT) of ISO/IEC MPEG and ITU-T VCEG, section 8.4.1.3, 2003.

* cited by examiner

*Primary Examiner*—Andy S Rao

(57) ABSTRACT

A method of motion vector prediction for use in differential motion vector coding within a block motion-compensation-based video coder. The video coder employs a generalized multiple reference picture buffer which may contain multiple reference pictures in both the forward and backward temporal direction from the current picture. For the purpose of coding selections of reference pictures within the buffer, the pictures are organized into two, potentially overlapping, lists of reference pictures. The prediction of a motion vector that selects a reference picture using a given reference picture list is not dependent upon any motion vectors that select their reference pictures using the other reference picture list. The values of spatially neighbouring motion vectors that use the same list of reference pictures as the notion vector being predicted are used for prediction, regardless of the relative temporal direction of the current and neighbouring motion vectors.

20 Claims, 7 Drawing Sheets

Picture #9

Picture #3

Macroblock 7 of Picture #8
List 0 Reference Index = 1 (Picture #3)
List 0 Motion Vector = (-14, 5)
List 1 Reference Index = 0 (Picture #9)
List 1 Motion Vector = (7, -5)

LOW-COMPLEXITY MOTION VECTOR PREDICTION FOR VIDEO CODEC WITH TWO LISTS OF REFERENCE PICTURES

FIELD OF THE INVENTION

The present invention relates to the field of video coding, more particularly it relates to a method of deriving predictions of motion vector values for the purpose of differential decoding of the final motion vector values in video codecs that use two reference pictures for motion compensated prediction and for coding purposes, these reference pictures being organized into two sets or lists.

BACKGROUND OF THE INVENTION

Video compression is used in many current and emerging products. It has found applications in video-conferencing, video streaming, serial storage media, high definition television (HDTV), and broadcast television. These applications benefit from video compression in the fact that they may require less storage space for archived video information, less bandwidth for the transmission of the video information from one point to another, or a combination of both.

Over the years, several standards for video compression have emerged, such as the Telecommunication Standardization Sector of the International Telecommunication Union (ITU-T) recommended video-coding standards: H.261, H.262, H.263 and the emerging H.264 standard and the International Standardization Organization and International Electrotechnical Commission (ISO/IEC) recommended standards MPEG-1, MPEG-2 and MPEG4. These standards allow interoperability between systems designed by different manufacturers.

Video is composed of a stream of individual pictures (or frames) made up of discrete areas known as picture elements or pixels. The pixels are organised into lines for display on a CRT or the like. Each pixel is represented as a set of values corresponding to the intensity levels of the luminance and chrominance components of a particular area of the picture. Compression is based mainly on the recognition that much of the information in one frame is present in the next frame and, therefore, by providing a signal based on the changes from frame to frame a much-reduced bandwidth is required. For the purpose of efficient coding of video, the pictures or frames can often be partitioned into individual blocks of 16 by 16 luminance pixels and blocks of 8 by 8 chrominance pixels, where a block of 16 by 16 luminance pixels and its corresponding two blocks of 8 by 8 chrominance pixels is called a "macroblock". This practice simplifies the processing which needs to be done at each stage of the algorithm by an encoder or decoder. To encode a macroblock (or sub-macroblock partition) using motion-compensated prediction, an estimation is made of the amount of motion that is present in the block relative to the decoded pixel data in one or more reference frames (usually recently decoded frames) and the appropriate manner in which to convey the information from which the current frame may be reconstructed. The residual signal, which is the difference between the original pixel data for the macroblock (or sub-macroblock partition) and its prediction, is spatially transformed and the resulting transform coefficients are quantized before being entropy coded. The basic processing blocks of an encoder are a motion estimator/compensator/predictor, a transform, a quantizer and an entropy coder.

Motion vectors are transmitted in the bitstream in order to convey information about the motion within a video sequence and provide an efficient coded representation of the video. Each motion vector conveys the translational motion information for a rectangular block in the current picture with respect to a set of blocks from previously coded and stored reference pictures. For efficient compression, motion vectors are coded differentially by forming a prediction for each motion vector based on motion information of previously coded neighbouring blocks and then transmitting only the difference between the actual motion vector and its prediction. The motion vector prediction is formed identically in both the encoder and decoder. In the encoder, the motion vector difference value to transmit is computed by subtracting the prediction for the actual motion vector. In the decoder, the decoded motion vector difference value is added to the motion vector prediction value in order to compute the actual motion vector.

In general, motion vector values of spatially adjacent blocks (neighbours) that have been previously decoded are used as the basis to form the motion vector prediction of a given block. The order of blocks in a bitstream generally follows a raster-scan order, which begins with the upper-leftmost block in each picture, and proceeds horizontally from left to right across each row of the picture, with the rows being ordered sequentially from top to bottom. Therefore, motion vector values from spatially adjacent blocks that precede the current block in this raster scan order are located in the row of blocks above the current block, as well as to the left of the current block. Median prediction using 3 neighbours has become popular in several recent video standards since it has shown strong correlation with the motion vector being predicted, with moderate complexity. Most commonly, the motion vectors from the blocks immediately above, left, and above-right of the motion block with the vector being predicted are used as the inputs to the median operator to generate the predicted motion vector. The left block is defined to be the block containing the pixel immediately to the left of the leftmost pixel in the current block. The above block is the block containing the pixel immediately above the uppermost pixel in the current block. The above-right block is the block containing the pixel immediately above and to the right of the upper-rightmost pixel in the current block. Finally, the above-left block is the block containing the pixel immediately above and to the left of the upper-rightmost pixel in the current block.

As an illustrative example of median motion vector prediction, consider the following array of blocks and their corresponding motion vector values.

| Above-Left | Above | Above-Right |
|---|---|---|
| (9, 7) | (8, 5) | (0, −2) |
| Left | Current | |
| (6, 4) | (9, 6) | |

Each motion vector is expressed with the horizontal component followed by the vertical component of the vector. AT the encoder, the predicted motion vector is computed and then the difference between the prediction and the current vector, which in this case is (9, 6), is transmitted in the bitstream. Assuming that the motion vectors from the left, above, and above-right blocks are used to form the prediction, the predicted motion vector is computed by taking a component-wise median of these input motion vectors as follows:

Horizontal Component=Median (6, 8, 0)=6

Vertical Component=Median (4, 5, −2)=4

Therefore the predicted motion vector is (6, 4) and the difference motion vector that is transmitted in the bitstream is computed as (9, 6)–(6, 4)=(3, 2).

At the decoder, the predicted motion vector is computed identically, since the motion vectors that are used as input to the prediction have already been decoded due to the raster-scan order transmission. The current motion vector is reconstructed by adding the difference motion vector to the predicted motion vector.

MV=Predicted MV+Difference MV=(6, 4)+(3, 2)=(9, 6)

Note that the motion vector prediction can be formed in a number of different ways depending on the specific coding standard being employed as well as the availability of neighbouring blocks. For example, in the H.264 video coding standard, if the above-right block is not available because it is beyond the picture boundaries, it may be replaced by the above-left block. In another example, if the current block is in the top row of the picture, only the left motion vector is available for prediction and this value is used directly as the predicted motion vector.

In the popular MPEG-2 video coding standard, 3 types of pictures, known as Intra (I), Predicted (P) and Bi-directional (B) pictures, are allowed. These picture types are differentiated by the availability of options for forming motion-compensated predictions. In I-pictures, motion compensated prediction is not permitted. Only Intra coding, which does not use prediction from any other picture, is permitted. In P-pictures, each macroblock can be Intracoded or coded using motion-compensated prediction from a single block in the previously coded picture that is also temporally previous in capture/display order. This type of prediction is referred to as uni-prediction, since only one block is used to form the prediction. Furthermore, it is referred to as forward prediction, since the current picture is being predicted from a picture that precedes it temporally. Finally, in B-pictures, motion-compensated predictions can additionally be derived from one temporally subsequent picture that has already been coded. This is referred to as backward prediction, since the current picture is being predicted from a picture that follows it temporally, and it requires that the coding order of pictures is different than the display order. Also, a motion-compensated prediction block can be formed by averaging the samples from 2 reference blocks, one from the previous picture and one from the subsequent picture. This averaging of two blocks is referred to as bi-prediction, and since the predictions are derived from two different temporal directions, it is also referred to as bi-directional. To summarize, in B-pictures, the prediction of each block can either be derived from a single block in the temporally previous picture (forward uni-prediction), a single block in the temporally subsequent picture (backward uni-prediction) or the average of two blocks, one from each of these two pictures (bi-directional bi-prediction).

The recent H.264 video coding standard allows similar prediction modes, but the use of reference pictures is much more flexible and generalized. First, the available prediction modes are not required to be the same for an entire picture, as in MPEG-2, but can be changed from slice to slice, where each slice contains a subset of the macroblocks of a picture. Thus, the H.264 standard refers to I-, P-, and B-slices, rather than I-, P-, and B-pictures, since different slice types can be mixed within a picture. Similar to the MPEG-2 standard, in I-slices, all blocks are Intra-coded without reference to any other picture in the video sequence. In P-slices, blocks can be Intra-coded or coded with motion-compensated prediction from a single block in a previously coded picture (uni-prediction) And in B-slices, bi-prediction is performed, where a block is predicted from two blocks from previously coded pictures is additionally permitted. However, the constraints in the MPEG-2 standard, which restrict which previously coded pictures can be used to predict the current picture, are greatly relaxed in the H.264 standard.

In MPEG-2, a maximum of one reference picture is available for predicting P-pictures, and a maximum of two reference pictures is available for predicting B-pictures. However, H.264 specifies a generalized buffer of multiple previously coded pictures that have been designated as reference pictures and are identically stored in both the encoder and decoder from which predictions can be derived for both P- and B-slices. For each motion-compensated prediction, a reference picture selection is included in the bitstream along with the spatial motion vector information. The reference picture selection specifies the picture from the set of available pictures from which the motion-compensated prediction is derived. Depending on the relationship between the coding order of pictures and the display order of the pictures, different possibilities exist for the prediction of each picture in terms of the temporal direction of the available reference pictures. In the most general case, the reference picture buffer contains multiple pictures that are temporally previous to the current picture in display order, as well as multiple pictures that are temporally subsequent to the current picture in display order. In this general case, a bi-predictive block in a B-slice can be derived from one block in each of the two temporal directions (as in the MPEG-2 case), or from two blocks from temporally previous reference pictures (possibly the same picture), or two blocks from temporally subsequent reference pictures (possibly the same picture).

For the purpose of coding the reference picture selections, the pictures in the reference picture buffer are organized into two ordered sets of pictures. It is possible that the same reference picture is included in both sets. In the terminology of the H.264 standard, these ordered sets of pictures are referred to as List 0 and List 1. The reference picture from which a motion-compensated prediction is derived is specified by transmitting an index into one of these ordered sets in the bitstream. In P-slices, only the List 0 set may be used. All motion-compensated blocks use uni-prediction from List 0. In B-slices, both List 0 and List 1 can be used. Each block can either be uni-predicted from a single picture in List 0 or from a single picture in List 1, or a block can be bi-predicted by selecting one picture from List 0 and one picture from List 1. Since the same pictures may appear in both lists, it is possible that in the bi-predictive case, the List 0 picture and the List 1 picture are actually the same picture. Thus, it is also possible that both pictures used to form a bi-predicted block are in the same temporal direction from the current picture. Most commonly, List 0 is used for referencing pictures that are temporally previous, and List 1 is used for reference pictures that are temporally subsequent, but in many cases, the use of the two lists is not restricted to following this convention.

Prior standards that used motion vector prediction did not define a flexible multiple reference picture buffer as in H.264, and did not organize these pictures into two ordered sets of reference pictures. Thus, special consideration of the new cases that occur in H.264 relating to the temporal direction and list usage of the neighbouring motion vectors used to generate motion vector predictions must be made. This consideration should strike a balance between complexity and coding efficiency.

The prior art method of specifying motion vector prediction in a codec with two lists of reference pictures and a flexible reference picture buffer is described in the document "Joint Final Committee Draft (JFCD) of Joint Video Specification (ITU-T Rec. H.264|ISO/IEC 14496-10 AVC)" by the Joint Video Team (JVT) of ISO/IEC MPEG and ITU-T VCEG. In the prior art method, motion vector prediction in B-slices is specified in a way that entails high computational complexity and complex data-dependencies. Motion vectors from neighbouring blocks are selected based on the temporal direction of the reference pictures used with these motion vectors in relation to the temporal direction of the reference picture used with the motion vector being predicted. Only forward motion vectors (referencing temporally previous pictures) are used to predict forward motion vectors, and only backward motion vectors (referencing temporally subsequent pictures) are used to predict backward motion vectors. If a neighbouring block does not have a motion vector referring to a reference picture in the same temporal direction as the current motion vector, both components of the motion vector predictor for that neighbouring block are set to zero for the purpose of prediction. If there is only one neighbouring motion vector that uses a reference picture in the same temporal direction as the current vector, the motion vector prediction is set equal to this motion vector and other neighbours are ignored. The prediction for a vector in either of the two lists could come from a neighbouring prediction using the same list, or the opposite list, depending on the temporal direction and relative temporal distances of the reference pictures.

Furthermore, in the prior-art method, a special case known as "scaled motion vector prediction" is used to generate the prediction for a List 1 motion vector for bi-predicted blocks in which both the List 0 and List 1 reference pictures are in the same temporal direction. In this case, the prediction of the List 1 motion vector is computed by temporally scaling the decoded List 0 motion vector from the same block, based on the relative temporal distances between the reference pictures to which these two motion vectors refer.

Prediction in P-slices, where only uni-prediction using List 0 is used, is much simpler. Here, temporal direction has no effect on the generation of the median motion vector prediction. Three spatial neighbours are used regardless of the temporal direction of the reference pictures that they refer to with respect to the temporal direction of the reference picture referred to by the current block.

The following examples illustrate the motion vector prediction process in B-slices in the prior art method. In the figures below, each motion vector is expressed using the following notation:

[ListNumber]: (Horizontal Component, Vertical Component), #ReferencePicture where ListNumber is either 0 or 1, and indicates the list of reference pictures to which the motion vector refers, and ReferencePicture indicates the display order number of reference picture used to generate the motion-compensated prediction for the block.

|  | Above | Above-Right |
|---|---|---|
|  | [0]: (5, 0), #6 | [0]: (5, 2), #6 |
|  | [1]: N/A | [1]: N/A |
| Left | Current |  |
| [0]: (9, 1), #3 | [0]: refers to #6 |  |
| [1]: (−4, 0), #9 | [1]: refers to #9 |  |

In this example, the above and above-right blocks only use List 0 prediction, so there are no List 1 motion vectors in these blocks. In the current block being predicted, the actual motion vector value is unknown in the decoder and not relevant for generating the prediction, but the reference pictures used for the prediction are required. Also, the display order number of the current pictures is also needed, since this determines the temporal direction in which each of the neighbouring motion vectors points. In this example, assume that the current picture is #8.

Since the current picture is #8, lower numbered pictures are temporally previous and higher numbered pictures are temporally subsequent to the current picture. The List 0 motion vector in the current block refers to picture #6, which is temporally previous (forward prediction), so, in the prior-art method, only neighbouring motion vectors that also refer to temporally previous pictures will be used to form the prediction of the current List 0 motion vector. In this case, all of the List 0 motion vectors from the above, above-right, and left block use forward prediction, so these 3 motion vectors are used to compute the the median motion vector. The resulting median motion vector is equal to (5, 1), which is the component-wise median of (9, 1), (5, 0), and (5, 2).

The List 1 motion vector in the current block refers to picture #9, which is a temporally subsequent picture (backward prediction). Thus, only backward motion vectors from the neighbouring blocks are used to compute the median motion vector. In this case, only the left block contains a motion vector (−4, 0) that is in the same temporal direction. Thus, the motion vector prediction value is equal to (−4, 0).

A second illustrative example of the prior-art motion vector prediction method is given in the figure below.

|  | Above | Above-Right |
|---|---|---|
|  | [0]: (5, 0), #6 | [0]: (5, 2), #6 |
|  | [1]: (6, −1), #6 | [1]: N/A |
| Left | Current |  |
| [0]: (12, 0), #3 | [0]: refers to #6 |  |
| [1]: (9, 1), #6 | [1]: refers to #3 |  |

In this example, assume that the current picture being encoded is #9 in display order. Note that in this example, all of the motion vectors refer to temporally previous reference pictures. The List 0 motion vector in the current block refers to picture #6. The above and left block both contain 2 pictures in the same temporal direction as the List 0 vector in the current block, so additional criteria are specified in the prior art to select between these. In the case that exists in the above block where both motion vectors refer to the same picture as the current motion vector, the prior art specifies that the List 0 motion vector (5, 0) be selected. From the left block, both motion vectors refer to pictures that are in the same temporal direction, but refer to different reference pictures. The prior art specifies that the motion vector referring to the temporally closest picture be selected, which in this case is the List 1 motion vector (9, 1). The above-right block contains one motion vector that is in the same temporal direction as the current motion vector. This vector, with a value of (5, 2), is also used to compute the median motion vector. Therefore, the resulting median motion vector for the prediction of the List 0 motion vector of the current block is equal to (5, 1), which is the component-wise median of (9, 1), (5, 0), and (5, 2).

In this example of the prior-art method, the prediction of the List 1 motion vector in the current block uses the special case of scaled motion vector prediction instead of median prediction. In this case, the prediction for the List 1 motion vector is computed by scaling the List 0 motion vector from the current block, based on the relative temporal distances of the reference pictures referred to by these two motion vectors. The temporal distance from the current picture (#9) to the picture referred to by the List 0 motion vector (#6) is equal to 3. The temporal distance from the current picture to the picture referred to by the List 1 motion vector (#3) is equal to 6. Since the temporal distance for the List 1 motion vector is double that of the List 0 motion vector, the scaled motion vector prediction of the List 1 motion vector is equal to the reconstructed List 0 motion vector multiplied by 2.

A third illustrative example of the prior-art motion vector prediction method is given in the figure below.

|  | Above | Above-Right |
|---|---|---|
|  | [0]: (5, 0), #6 | [0]: (5, 2), #6 |
|  | [1]: (−6, −1), #9 | [1]: (−8, −3), #9 |
| Left | Current |  |
| [0]: (12, 0), #3 | [0]: refers to #6 |  |
| [1]: (9, 1), #6 | [1]: refers to #9 |  |

In this example, assume that the current picture being encoded is #8 in display order. The List 0 motion vector in the current block refers to picture #6, which is a temporally previous picture. The left block contains 2 pictures in the same temporal direction as the List 0 vector in the current block, so additional criteria are specified in the prior art to select between these. As in the previous example, the prior art specifies that the motion vector from the left block that refers to the temporally closest picture will be selected, which in this case is the List 1 motion vector (9, 1). The above and above-right blocks each only contain one motion vector that refers to a temporally previous reference picture, so these motion vectors are selected for input to the median filter. The resulting median motion vector is equal to (5, 1), which is the component-wise median of (9, 1), (5, 0), and (5, 2).

For the prediction of the List 1 motion vector, which refers to reference picture #9, only motion vectors that refer to temporally subsequent reference pictures are selected. Since the left block does not contain such a motion vector, a motion vector with value (0, 0) is used as input to the median operator in its place. The above and above-right blocks each only contain one motion vector that refers to a temporally subsequent reference picture, so these motion vectors are selected for input to the median filter. The resulting median motion vector is equal to (−6, −1), which is the component-wise median of (0, 0), (−6, −1), and (−8, −3).

The above examples illustrate the prior-art method used for selecting the neighbouring motion vectors that are used to form the motion vector prediction in the draft H.264 video coding standard. The major disadvantage of this method is that its complexity is high. The selection of the neighbouring motion vectors based on their temporal direction and relative temporal distances requires a large number of conditions to be tested in order to determine which vectors will be used to form the prediction. Moreover, the computation of the scaled motion vector prediction requires complex division operations to be performed in order to temporally scale the decoded List 0 motion vector to generate the prediction for the List 1 motion vector. Finally, the fact that the motion vector predictions of each list are dependent upon the motion vectors in the other list requires that the motion vectors for both lists in each partition of a macroblock be decoded sequentially, rather than computing all of the List 0 motion vectors for an entire macroblock, followed by all of the List 1 motion vectors for that macroblock (or vice-versa).

It is an object of the present invention to provide a method of selecting neighbouring motion vectors for use in motion vector prediction to obviate or mitigate some of the above-presented disadvantages.

SUMMARY OF THE INVENTION

According to the present invention, there is provided a method of selecting neighbouring motion vectors for use in motion vector prediction in a video codec that organizes pictures into two sets or lists and employs a generalized multiple reference picture buffer. The method includes complexity-reduction improvements in the selection of neighbouring motion vectors and the computation of the predicted motion vector. According to the present invention, the prediction of a motion vector that uses a specific reference picture list depends only upon neighbouring motion vectors that use the same reference picture list. There is no dependency between the motion vectors that refer to one list and those that refer to the other list in terms of their use in predicting motion vectors for differential coding.

According to a further aspect of the present invention, the temporal direction of the reference pictures referred by the current and neighbouring motion vectors have no bearing on the motion vector prediction for the current motion vector. Neighbouring motion vectors that refer to the same list of reference pictures as the current motion vector being predicted are used to form the prediction regardless of the temporal direction or temporal distances of the reference pictures referred to by each of the motion vectors.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

Figure 1:
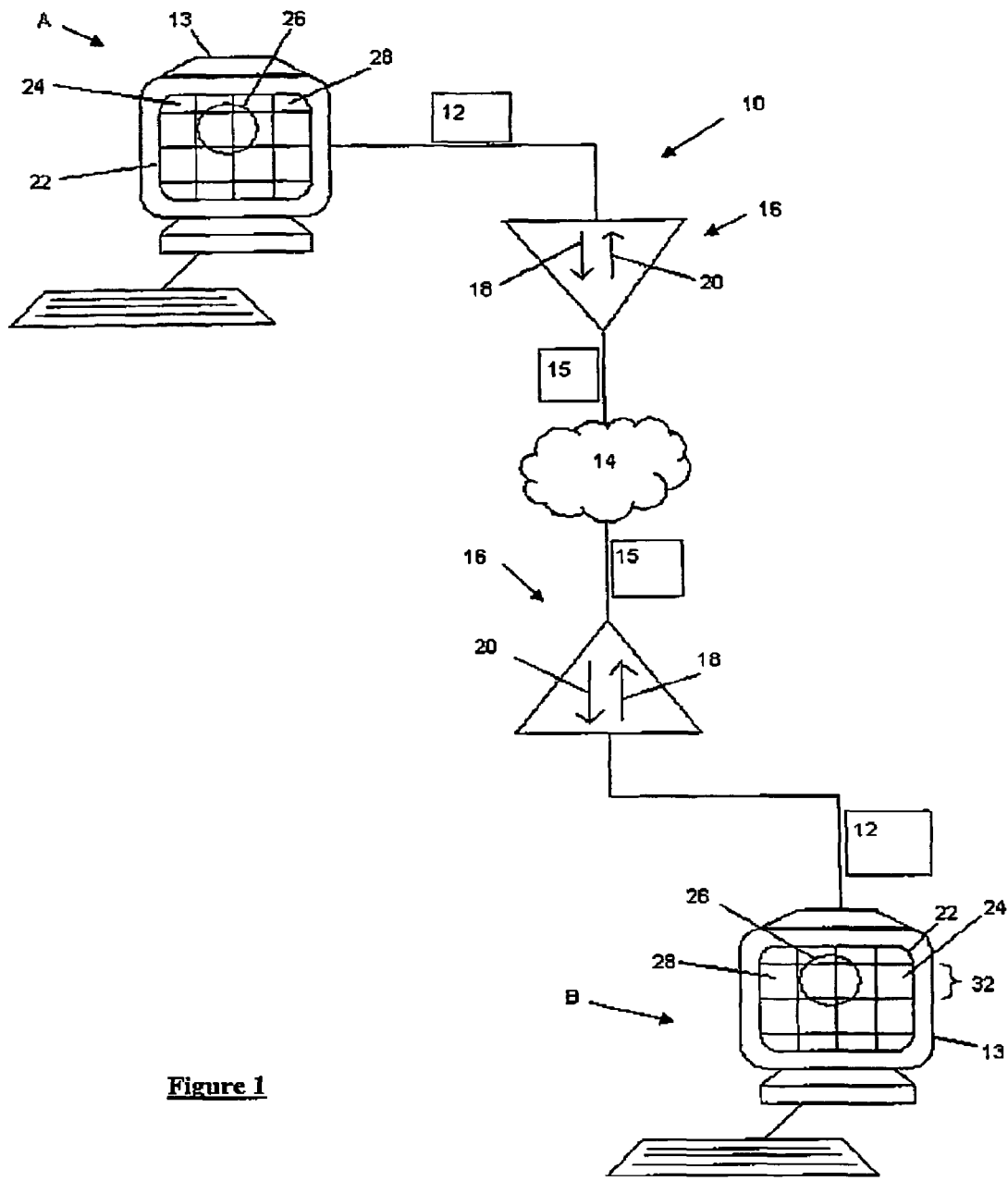
FIG. 1 is a schematic representation of a data transmission system.

Referring to FIG. 1, a video conferencing system 10 used as an example of a video transmission system has participants A and B that exchange video data 12 between monitors 13, formatted as a compressed bit stream 15 over a network 14 (such as but not limited to the Internet). Each participant A, B has a video processor 16 having an encoder 18 for encoding transmitted video data 12 and a decoder 20 for decoding the received bit stream 15. Each image frame 22 displayed on the monitors 13 is made of a series of macroblocks 24, such as but not limited to a block of 16×16 pixels, representing (for example) an object 26 which moves over a background 28 (for example a person giving a presentation while standing in front of a backdrop). Accordingly, the processors 16 coordinate the display of successive frames 22 on the monitors 13, as the video data 12 is communicated between the participants A, B, which can include applications such as video conferencing. It will be appreciated recognised that the system 10 may also involve the exchange of video data 12 in the compressed bit steam 15 in either one direction or both and on peer-to-peer basis or broadcast.

Figure 3:
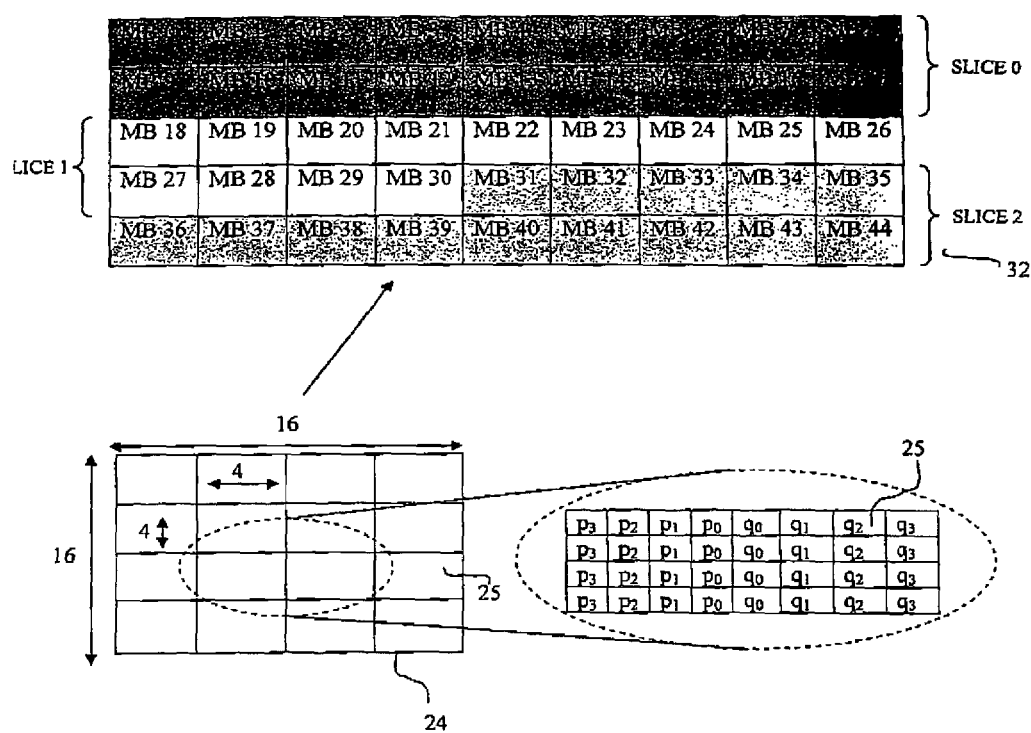
FIG. 3 is a representation of a macroblock and a block.

The video data 12 is a temporal sequence of pictures, each referred to as a frame or field 22. Each picture 22 is organized as a matrix of macroblocks 24. Each macroblock 24 has a size of 16 by 16 pixels and the macroblocks 24 are stored from left to right and from top to bottom and groups of macroblocks 24 are combined in a slice 32. Generally, a slice 32 contains macroblocks 24 and each macroblock 24 consists of a number of blocks 25 (see FIG. 3) that are nominally 4 pixels by 4 pixels. Generally, each macroblock 24 is composed of three images; one red (R), one green (G), and one blue (B). However, for compatibility with non-coloured media, the RGB model is represented as an equivalent YCbCr model, where Y is a luminance (luma) component, and Cb and Cr are chrominance (chroma) components, such that typically Y=0.299R+0.587G+0.114B, Cb=B—Y, and Cr—R—Y. Therefore, each frame 22 of the video data 12 is generically referred to as containing one luma image, one Cb chroma image, and one Cr chroma image. Standard formats have 8 bits per pixel to digitally represent each of the three components, where Cb and Cr images are typically downsampled by 2 in each dimension due to the sensitivity of human vision. Generally, each block 25 consists of four pixels for the luma components and one pixel for each chroma component of the 4:2:0 color data. The blocks 25 are processed and compressed for transmission as the bit stream 15 over the network 14 (see FIG. 1).

Generally, one of three fundamental coding modes can be selected for each macroblock 24, with the choice of coding mode determining how the prediction of a macroblock 24 is formed. Intra-coded (I) macroblocks 24 make use of intra-prediction, in which the prediction is formed using only the current picture. In predictive (P), or inter-coded, macroblocks 24 the prediction of each sample is formed by referring to one block 25 in the set of previously decoded and stored reference pictures 22. In bi-predictive (B) macroblocks 24, predictions can be formed in this way, but can also be formed by computing a weighted average of two different blocks 25 in the set of previously decoded reference pictures 22. It will be noted that some of the previously decoded pictures 22 are typically temporally subsequent to the current picture in terms of their intended display order when bi-predictive coding is used. Depending on the mode of each slice 32, which is indicated in the slice header 27, P- and B-macroblocks 24 may not be permitted within certain slices 32.

Figure 2:
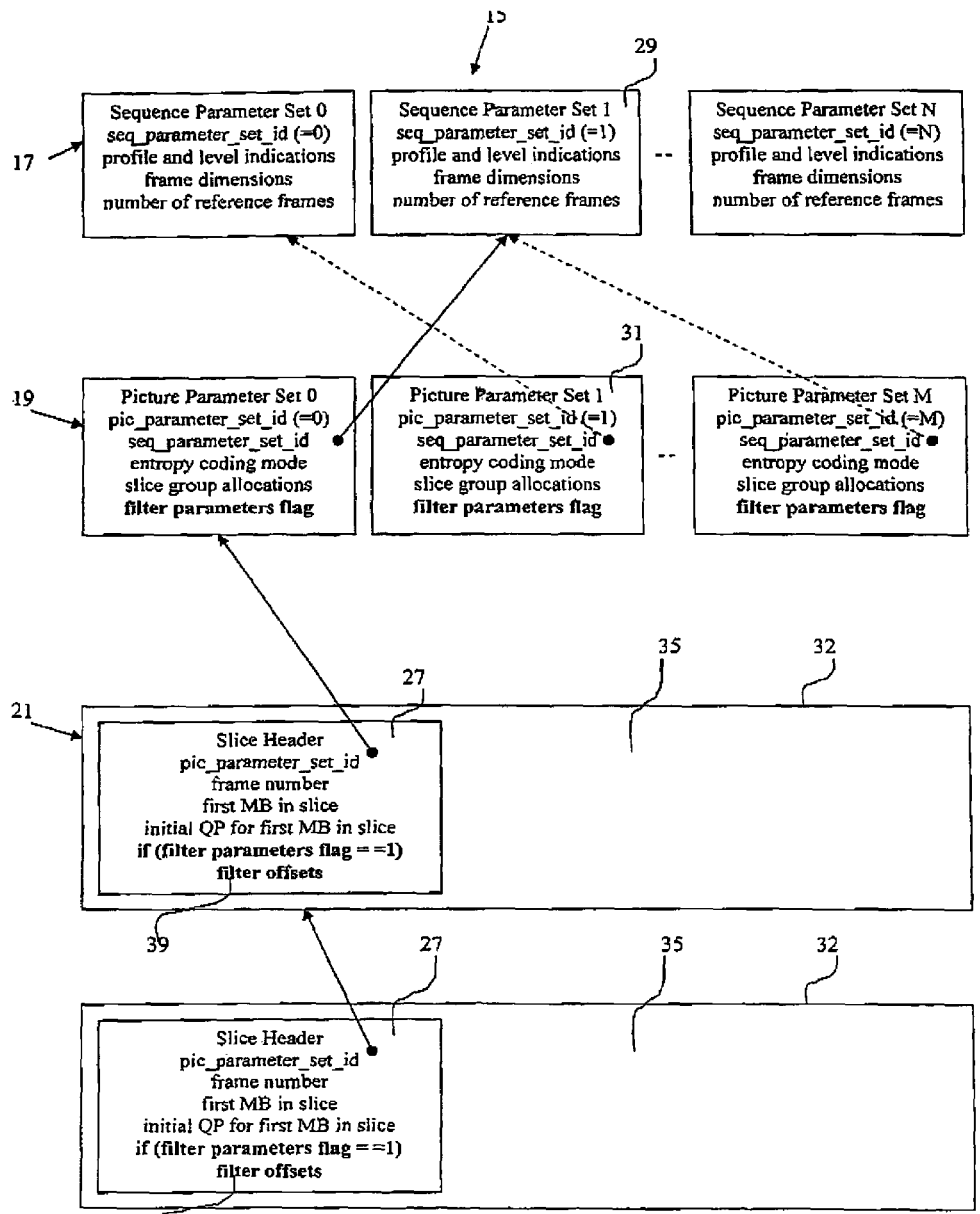
FIG. 2 is schematic representation of the hierarchial organisation of the high-level syntax of the H.264 standard.

Referring to FIG. 2, the bitstream 15 is organized into a hierarchy of syntax levels, with the 3 main levels being a sequence level 17, a picture (or frame) level 19, and slice level 21. A concept known as "parameter sets" allows efficient transmission of infrequently changing data at the sequence 17 and picture level 19 in the H.264 standard A sequence parameter set 29 in the first level 17 includes values of parameters that will remain unchanged for an entire video sequence, or from one instantaneous decoder refresh (IDR) picture to the next. (IDR pictures are used to provide points of random access into the bitstream). Examples of parameters in a sequence parameter set 29 include frame dimensions and the maximum number of reference frames. A unique ID number "N" identifies each sequence parameter set 29.

A picture parameter set 31 in the second level 19 includes values of parameters that will remain unchanged within a coded representation of a picture (frame or field) 22. Examples of parameters in the picture parameter set 31 include the entropy coding mode and a flag that specifies whether deblocking filter parameters will be transmitted in the slice headers 27 of the picture 22 (see FIG. 1). Each picture parameter set 31, labeled as "M", refers to the unique ID of a valid sequence parameter set 29, which selects the active sequence parameters that are used when decoding coded pictures 22 that use the particular picture parameter set 31. The unique ID number "M" identifies each picture parameter set 31.

A slice 32 in the bit stream 15 contains a picture data 35 representing a sub-set of the macroblocks 24 of the complete picture 22. The macroblocks 24 in a slice 32 are ordered contiguously in raster scan order. The coded slice 32 includes the slice header 27 and the slice data 35 (coded macroblocks 24). The slice header 27 contains a coded representation of data elements 35 that pertain to the decoding of the slice data that follow the slice header 27. One of these data elements contains a reference to a valid picture parameter set 31, which specifies the picture parameter values (and indirectly the sequence parameter values) to be used when decoding the slice data 35. Each slice header 27 within the same picture 22 must refer to the same picture parameter set 31. Other data elements in the slice header 27 include the initial quantization parameter for the first macroblock 24 in the slice 32 and deblocking filter offset parameters 39, if the transmission of such offset parameters 39 is specified in the active picture parameter set.

Referring further to FIG. 2, each of the pictures 22 can select individual picture parameter sets that specify the picture structure and the picture coding type. For exemplary purposes only, FIG. 3a contains the macroblock 24 each consisting of a grouping of pixels, such as a 16×16 luma block 25 with the two associated 8×8 chroma blocks 25. However, it is recognized that other sizes of blocks 24 could be used to represent the frames 22, if desired. Each slice 32 of the frame 22 is encoded by the encoder 18 (see FIG. 1), independently from the other slices 32 in the frame 22. Each of the slices 32 has the slice header 27 that provides information, such as but not limited to the position of the respective slice 32 in the frame 22 as well as the initial quantization parameter; QP and the slice data which provides information for reconstructing the macroblocks 24 of a slice 32, such as but not limited to the prediction modes and quantised coefficients for each of the respective macroblocks 24.

Figure 4:
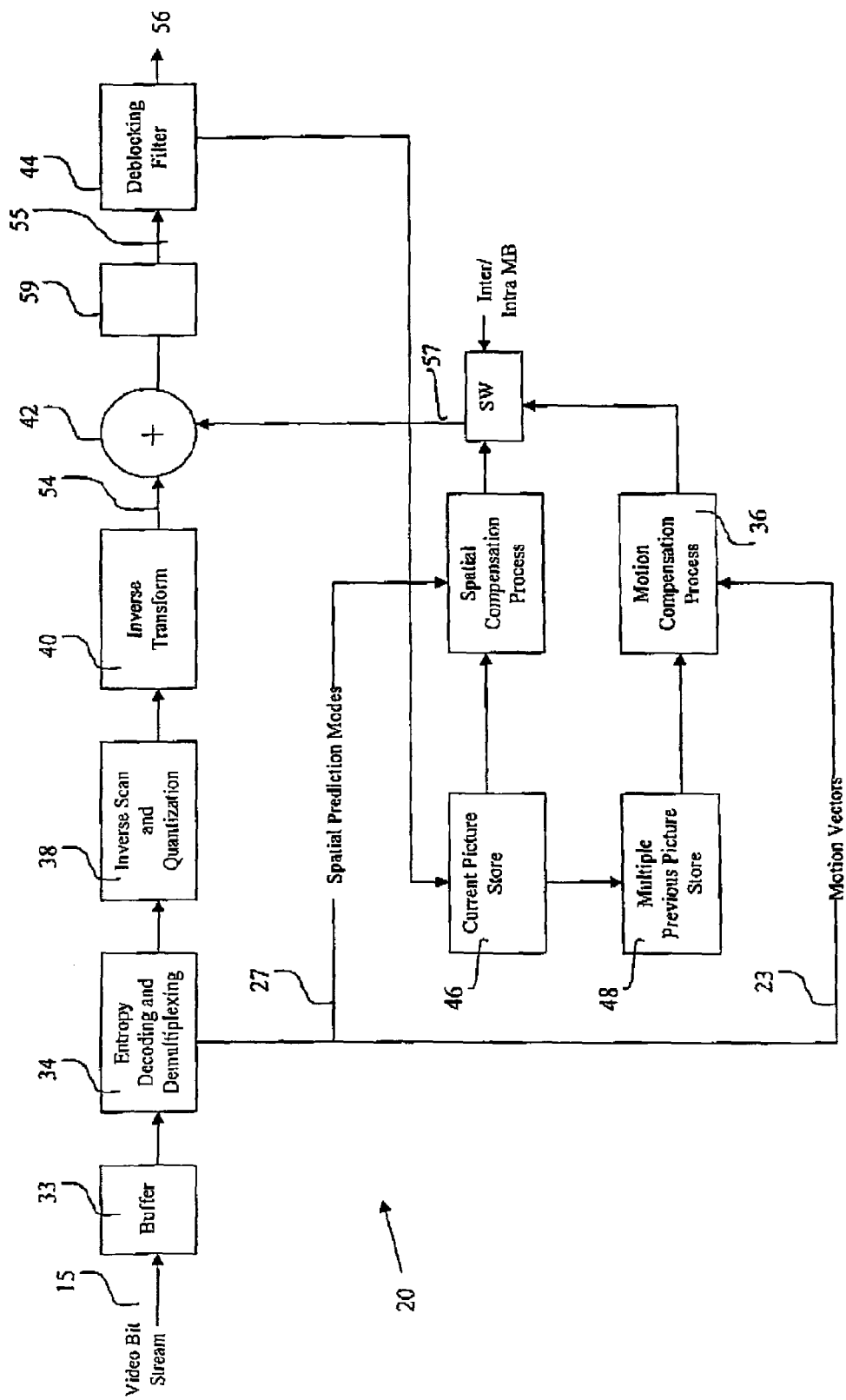
FIG. 4 is a block diagram of a hybrid block-based video decoder including a deblocking filter inside the motion compensation loop of the system of FIG. 1.

Referring To FIG. 4, the decoder 20 processes the received bit stream 15 and then reconstructs the predicted frame 46, using a stored copy of the reference frame(s) stored in a buffer 48, the transmitted motion vectors 23, and the decompressed or reassembled prediction error 54 contained in the bit stream 15 to produce the reconstructed video images 55.

More particularly, the functional units include a buffering unit 33 that receives the compressed bitstream 15, an entropy decoder 34 which decodes the received bit stream 15 to produce syntax elements used in subsequent processing by the other decoder 20 components, a motion compensated prediction 36 to produce the predicted frame, an inverse scanning and quantization unit 38, and inverse transform units 40 to reproduce the coded prediction error 54. A reconstruction unit 42 adds the prediction error 54 to the predicted pixels 57 to produce the reconstructed frame 55 which is stored in a temporary buffer 59. The reconstructed frame is fed to a deblocking filter 44 that smoothes the edges of sub-blocks within the reconstructed frame 55 to produce the filtered reconstructed frame 56. Each of the above mentioned components is discussed in more detail in the following.

The incoming video bitstream 15 is stored in a buffer 33 at the input to the decoder 20. The first stage in the decoding process includes the parsing and decoding of the entropy coded bitstream symbols that are stored in a buffer 33 to produce the syntax elements used by the other decoder 20 components.

The various syntax elements in the bitstream 15 are demultiplexed for use in different processes within the decoder 20. High-level syntax elements include temporal information for each frame 22, frame coding types and frame dimensions. The coding can be based primarily on macroblocks 24 consisting of 16×16 luminance-pixel blocks 25 and 2 8×8 chrominance pixel blocks 25. On the macroblock 24 level, syntax elements include the coding mode of the macroblock 24, information required for forming the prediction, such as motion vectors 23 and spatial prediction modes 27, and the coded information of the residual (difference) blocks, such as the coded block pattern (CBP) for each macroblock 24 and quantized transform coefficients for each of the underlying blocks 24.

Depending on the coding mode of each macroblock 24, the predicted macroblock 24 can be generated either temporally (inter prediction) or spatially (intra prediction). Two different modes are supported in intra prediction and coding of macroblocks 24. In the 4×4 Intra mode, each 4×4 block within a macroblock 24 can use a different prediction mode. In the 16×16 Intra mode, a single prediction mode is used for the entire macroblock 24. The prediction of intra-coded blocks 25 is always based on neighboring pixel values that have already been decoded and reconstructed.

The prediction for an inter-coded macroblock 24 is specified by the motion vectors 23 that are associated with that macroblock 24. The motion vectors 23 indicate the position within the set of previously decoded frames from which each block of pixels will be predicted. Each inter-coded macroblock 24 can be partitioned in a number of different ways, using blocks of seven different sizes. The possible luminance block sizes for inter-coded blocks are: 16×16, 16×8, 8×16, 8×8, 8×4, 4×8 and 4×4 pixels. Also, a special SKIP mode exists in which no motion vector difference values 23 (or coded residual blocks) are transmitted and the prediction is taken from a location in the previous picture that is predicted by the values of previously decoded motion vectors 23 of macroblocks 24 neighbouring the current macroblock 24. Thus, 0 to 16 motion vectors 23 can be transmitted for each inter-coded macroblock 24. Additional predictive modes in which two different motion vectors 23 correspond to each pixel and the sample values are computed using a weighted average are supported when bi-predictive macroblock types are employed.

For each motion vector 23, a predicted block 25 must be computed by the motion compensation processor 36 of the decoder 20 and then arranged with other blocks 24 to form the predicted macroblock 24. Motion vectors 23 in H.264 are specified generally with quarter-pixel accuracy. Interpolation of the reference video frames is necessary to determine the predicted macroblock 24 using sub-pixel accurate motion vectors 23. Multiple reference pictures 22 can also be used for motion-compensated prediction. Selection of a particular reference pictures 22 is made on an 8×8 sub-macroblock 24 basis, or larger if a larger sub-macroblock partition size is used for generating the motion-compensated prediction. This feature can improve coding efficiency by providing a larger set of options from which to generate a prediction signal.

The available multiple reference pictures 22 used for generating motion-compensated predictions in each P-slice or B-slice are organized into two ordered sets of pictures. The same pictures may be included in both sets. The two sets of reference pictures are referred to as List 0 and List 1 and the ordered position at which each picture appears in each list is referred to as its reference index.

Figure 5:
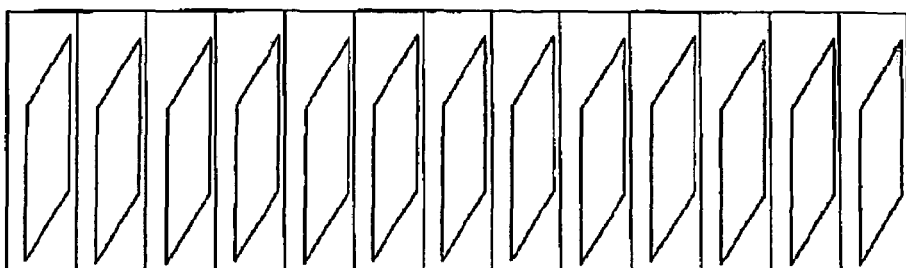
FIG. 5 shows an illustration of the multiple reference picture buffer and the assignment of reference index values to each picture in the reference picture buffer using List 0 and List 1.

An example illustrating the organization of the reference picture buffer into two lists is given in FIG. 5. This figure shows a sequence of pictures that comprise a segment of a video sequence in the display order of the pictures. In the example, only each third picture is made a reference picture (i.e. stored in the reference picture buffer and used to generate motion-compensated predictions for subsequent coded pictures). In this example, the reference picture buffer is illustrated as it might exist when picture number 8 is currently being encoded or decoded. Picture number 8 is encoded using B-slice prediction. Also assume that the coding order of the pictures is different than the display order. Specifically, pictures 9 and 12 are encoded and present in the bitstream prior to picture number 8. Thus, these pictures can be available in the reference picture buffer and used to generate motion-compensated predictions during the decoding of picture number 8. Below each picture, examples of the typical index values for each picture into List 0 and List 1 are given. Only every third picture (beginning with picture number 0) may be assigned reference index values, since the remaining pictures are not stored in the reference picture buffer. The order of the pictures in List 0 is: 6, 3, 0, 9, 12. A specific reference picture for producing a motion-compensated prediction is selected by transmitting an index into either List 0 or List 1, where this index will have a value from 0 up to one less than the number of pictures in the list. Thus, if the value of the List 0 reference index parameter for a given block is 0, picture number 6 is used to produce the motion-compensated prediction for this block. If the value of the List 0 reference index parameter is 3, picture number 9 is used to produce the motion-compensated prediction for this block. Similarly, the order of pictures in List 1 is: 9, 12, 6, 3, 0. Thus, if the value of the List 1 reference index parameter for a given block is 0, picture number 9 is used to produce the motion-compensated prediction for this block. Notice that when a picture is present in both lists, it can be referred to through a reference index into either of the two lists, though the specific index value may differ.

The reference picture from which a motion-compensated prediction is derived is specified by transmitting within the bitstream a reference index into one of these ordered lists. In P-slices, only the List 0 set may be used and all motion-compensated blocks use uni-prediction from List 0. In B-slices, both List 0 and List 1 can be used. Each block can either be uni-predicted from a single picture in List 0 or from a single picture in List 1, or a block can be bi-predicted by selecting one picture from List 0 and one picture from List 1. Since the same pictures may appear in both lists, it is possible that in the bi-predictive case, the List 0 picture and the List 1 picture are actually the same picture. Thus, it is also possible that both pictures used to form a bi-predictive block are in the same temporal direction from the current picture.

Figure 6:
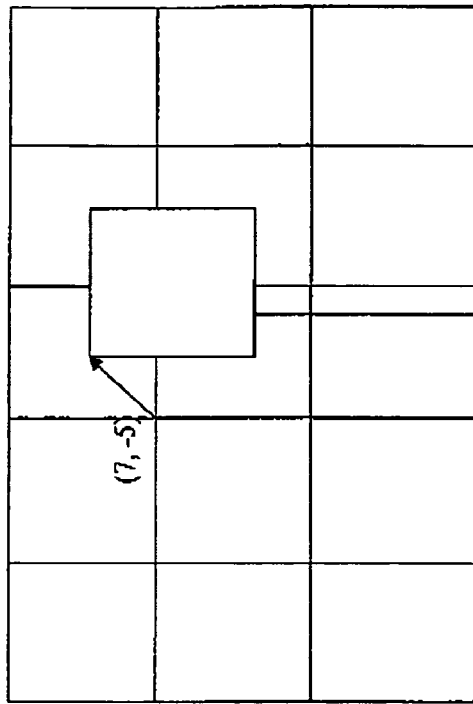
FIG. 6 shows an example of the formation of a bi-predictive motion compensated prediction for a single macroblock by selecting two blocks of samples from within the set of reference pictures in the reference picture buffer using reference picture indexes and spatial motion vectors.
Figure 6:
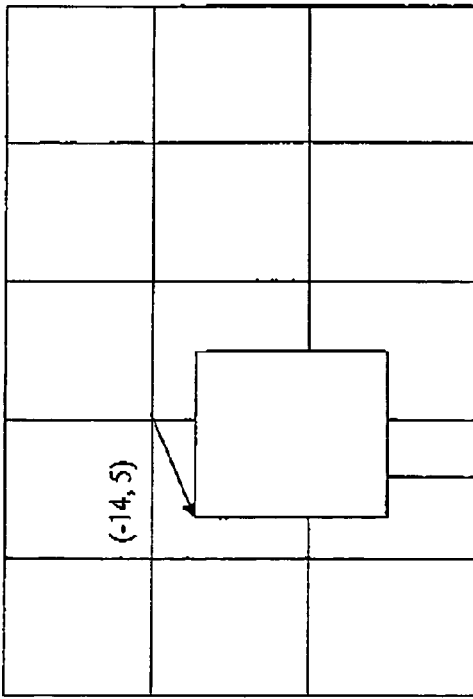
Figure 6:

In FIG. 6, the process of using two different blocks from two reference pictures in order to produce a bi-predictive motion-compensated prediction is illustrated by example. This example illustratively uses a picture resolution that is 5 macroblocks in width and 3 macroblocks in height. Building on the example given in FIG. 5, assume that the current picture number is 8 and the reference index lists are as illustrated in FIG. 5. The figure illustrates the generation of the motion-compensated prediction for macroblock number 7 in raster-scan order, using the 16×16 motion-compensation partition size, in which all samples within the 16×16 block are predicted using the same motion vectors. The List 0 reference index has a value of 1, which from FIG. 5, refers to picture number 3. Thus, a reference block from List 0 is selected by applying a spatial offset equal to the List 0 motion vector of (−14, 5) from the position of macroblock number 7 within picture number 3. Similarly, the List 1 reference index value of 0 selects picture number 9 as the reference picture to be used to generate the List 1 prediction. The reference block from List 1 is selected by applying a spatial offset equal to the List 1 motion vector of (7, −5) from the position of macroblock number 7 within picture number 9. These two 16×16 reference blocks are then used as the input to a sample-by-sample averaging process to compute the final motion-compensated prediction for macroblock number 7.

The decoding of a residual (difference) macroblock 24 requires that a number of transforms be performed on any blocks for which non-zero transform coefficients were transmitted in the bitstream, along with associated scanning and coefficient scaling operations. The transforms that are required for each macroblock 24 are determined based on the coding mode and the coded block pattern (CBP) of the macroblock 24. The decoding of a difference macroblock 24 is based primarily on the transformation of 4×4 blocks 25 of both the luminance and chrominance pixels, although in some circumstances, a second-level transform must be performed on the DC coefficients of a group of 4×4 blocks 25 for macroblocks 24 that are coded in the 16×16 Intra prediction mode. Additionally, a special 2×2 transform is applied to the 4 DC coefficients of the chrominance residual blocks 25 of a macroblock 24.

The values of the quantized coefficients are parsed and decoded by the entropy decoder 34. These are put into their correct order based on the run values through the scanning process and then the levels, which represent quantized transform coefficients, are scaled via multiplication by a scaling factor. Finally, the necessary transform to reconstruct the coded residual signal for a block is performed on the scaled coefficients. The result of the transforms for each macroblock 24 is added to the predicted macroblock 24 and stored in the reconstructed frame buffer 59.

In the final stage of the decoding process, the decoder 20 applies the normative de-blocking filtering process, which reduces blocking artifacts that are introduced by the coding process. The filter 44 is applied within the motion compensation loop, so both the encoder 18 and decoder 20 must perform this filtering. The filtering is performed on the 4×4 block edges of both luminance and chrominance components. The type of filter 44 used, the length of the filter and its strength are dependent on several coding parameters as well as picture content on both sides of each edge. The filtered pictures that are to be used for generating motion compensated predictions for subsequent coded pictures are stored in the reference picture buffer.

The motion vector values are computed through a differential decoding process, in which the coded difference for each motion vector that is contained in the bitstream is added to a predicted value for that motion vector, the predicted value being computed identically in both the encoder and decoder.

Figure 7:
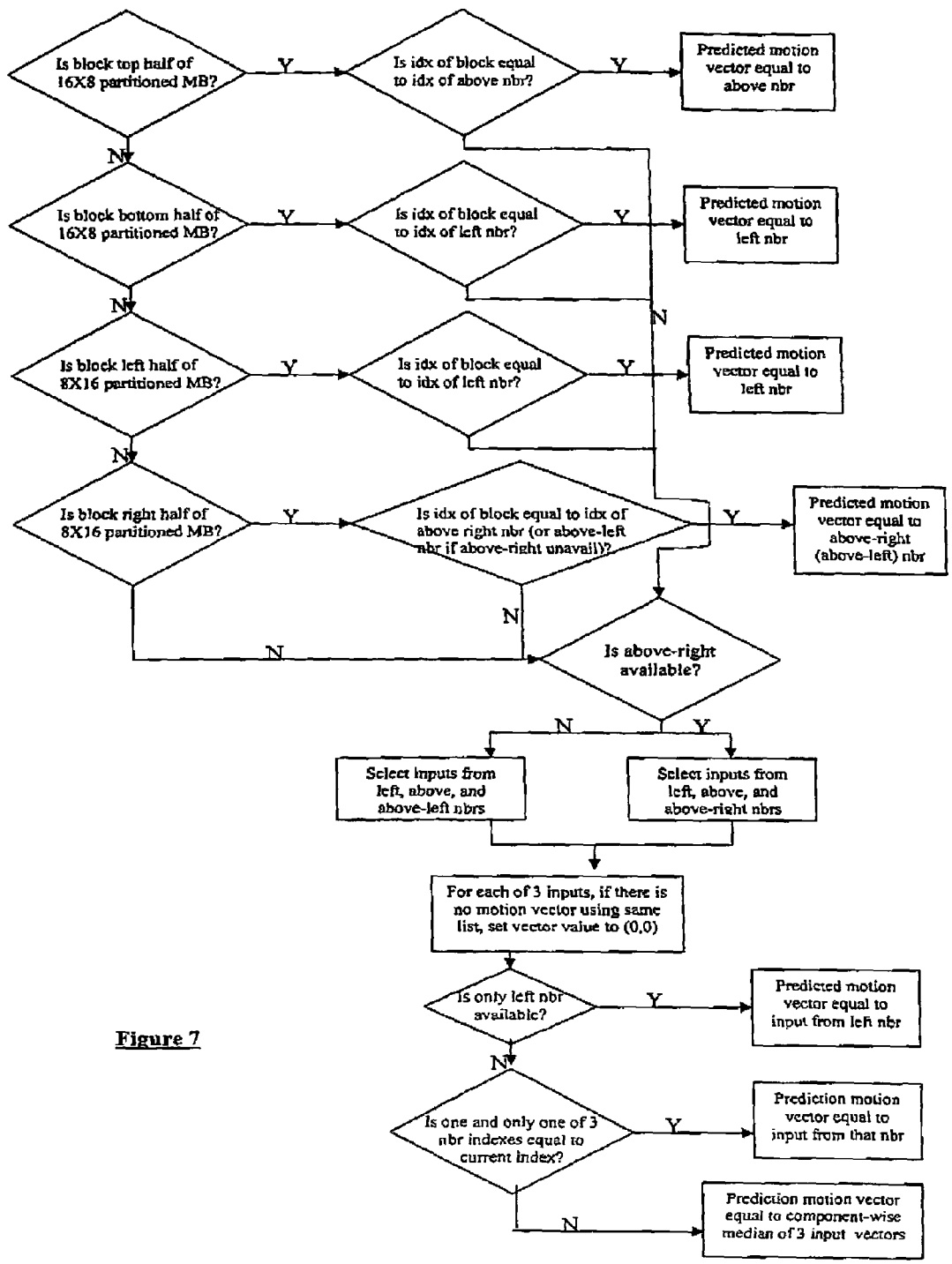
FIG. 7 is a flowchart indicating the steps followed in determining motion vector prediction for a block

In the motion vector prediction process, one of two methods is used to compute each motion vector prediction. In the first method, which is referred to as directional segmentation prediction, only a single neighbouring motion vector is used to compute the motion vector prediction. In the second method, which is referred to as median motion vector prediction, motion vectors from up to three neighbouring blocks are used to compute the motion vector prediction. The vector prediction process is perform end independently for each reference picture list and is shown schematically in FIG. 7.

The directional segmentation method is only used in the special case of a motion-compensated macroblock that is partitioned into 2 16×8 or 8×16 sub-blocks, when the selected neighbouring block used to derive the prediction contains a motion vector that uses the same reference index in the same reference picture list as the current block being predicted. In these cases, the motion vector for the left half of an 8×16 partitioned macroblock is predicted from the block to its left. The motion vector for the right half of an 8×16 partitioned macroblock is predicted from the block above it and to the right. The motion vector for the top half of a 16×8 partitioned macroblock is predicted from the block above it. The motion vector for the bottom half of a 16×8 partitioned macroblock is predicted from the block to its left. All of these special directional predictions are only used if the specified neighbouring block was motion compensated using a reference picture in the same reference picture list and the sane reference index as used for motion compensating the current block.

In the case of an 16×8 or 8×16 partitioned block in which the specified neighbouring motion vector does not use the same reference index and list as the current motion vector, and in the case of all other motion-compensation partition sizes, the motion vector predictions are computed using the median motion vector prediction method. This is based on the values of the motion vectors in three neighbouring blocks that reference the same list as the motion vector being predicted.

The inputs to the 3 component median filter are generally derived from the blocks directly above, to the left, and to the above-right of the block being predicted. However, in cases where the above-right block is not available in the current slice, the above-left block is used in its place, provided that the above-left block is available. If one of the neighbouring blocks is not available due to the encoding order or due to picture or slice boundaries, or does not use a motion vector that refers to the same reference picture list as the current motion vector being predicted, both the horizontal and vertical components of that motion vector are set equal to zero for use in the median computation. When only the left block is available from amongst the three neighbouring blocks, the motion vector prediction is set directly equal to the value of the motion vector used in predicting the left block. Otherwise, if one and only one of 3 neighbouring blocks is predicted using a reference index that is equal to the reference index used to predict the current block, the motion vector prediction is set equal to the value of the motion vector used to predict that neighbouring block. Otherwise, the horizontal and vertical components of the motion vector prediction are computed by taking the median of the horizontal and vertical components of the 3 neighbouring motion vectors, using the vector (0, 0) in place of any blocks that are unavailable or do not contain a motion vector using the same reference picture list as the motion vector being predicted.

In the present invention, the prediction of motion vectors in each of the two reference picture sets (List 0 and List 1) is independent of the motion vectors that used the opposite reference picture set. Furthermore, the motion vector prediction is independent of the temporal direction of the motion vectors in the current and neighbouring blocks. Motion vector prediction of a block in a given list depends only on the motion vectors from the same list in neighbouring blocks. The spatially neighbouring motion vector components are used as input values to the median process regardless of the temporal direction or relative temporal distances of the reference picture referred to by the current and neighbouring motion vectors.

The following examples illustrate the preferred embodiment of the motion vector prediction process in B-slices according to the present invention. In these examples, assume that the partition size of the current block is not 16×8 or 8×16, so that a median of neighbouring motion vector values is used to form the prediction rather than the special case of directional motion vector prediction.

|  | Above | Above-Right |
|---|---|---|
|  | [0]: (5, 0), #6 | [0]: (5, 2), #6 |
|  | [1]: N/A | [1]: N/A |
| Left | Current |  |
| [0]: (9, 1), #3 | [0]: refers to #6 |  |
| [1]: (−4, 0), #9 | [1]: refers to #9 |  |

In this example, the above and above-right blocks only use List 0 prediction, so there are no List 1 motion vectors in these blocks. In the current block being predicted, the actual motion vector value is unknown in the decoder and not relevant for generating the prediction, but the reference pictures used for the prediction are required. Also, the display order number of the current pictures is also needed, since this determines the temporal direction in which each of the neighbouring motion vectors points. In this example, assume that the current picture is #8.

The List 0 motion vectors from the left, above, and above-right blocks are used as input to a median filter to generate the prediction for the List 0 motion vector in the current block. The resulting median motion vector is equal to (5, 1), which is the component-wise median of (9, 1), (5, 0), and (5, 2). Since only the left block contains a List 1 motion vector, the value of this motion vector is used directly as the motion vector prediction for the List 1 motion vector in the current block. In this case, the value of the predicted motion vector is (4, 0). In this example, where the List 0 motion vectors use forward prediction and the List 1 motion vectors use backward prediction, which is common in most encoders, the resulting motion vector predictions are identical to that produced by the prior-art method. However, the complexity of computing the prediction is greatly reduced since there is not need to perform the process of selecting neighbouring motion vectors based on their temporal directions and temporal distances.

A second illustrative example of this preferred embodiment of the present invention is given in the figure below.

|  | Above | Above-Right |
|---|---|---|
|  | [0]: (5, 0), #6 | [0]: (5, 2), #6 |
|  | [1]: (6, −1), #6 | [1]: N/A |
| Left | Current |  |
| [0]: (12, 0), #3 | [0]: refers to #6 |  |
| [1]: (9, 1), #6 | [1]: refers to #3 |  |

In this example, assume that the current picture being encoded is #9 in display order. Note that in this example, all of the motion vectors refer to temporally previous reference pictures. The List 0 motion vectors from the left, above and above-right blocks are used as input to a median filter to generate the prediction for the List 0 motion vector in the current block. The resulting median motion vector is equal to (5, 0), which is the component-wise median of (12, 0), (5, 0), and (5, 2) For prediction of the List 1 motion vector, a value of (0, 0) is used as input to the median operator for the above-right block, since this block does not contain a motion vector that uses List 1. This motion vector is used as input to the median filter along with the List 1 motion vectors from the left and above blocks to generate the prediction for the List 1 motion vector in the current block. The resulting median motion vector is equal to (6, 0), which is the component-wise median of (9, 1), (6, −1), and (0, 0).

A third illustrative example of this preferred embodiment of the present invention is given in the figure below.

|  | Above | Above-Right |
|---|---|---|
|  | [0]: (5, 0), #6 | [0]: (5, 2), #6 |
|  | [1]: (−6, −1), #9 | [1]: (−8, −3), #9 |
| Left | Current |  |
| [0]: (12, 0), #3 | [0]: refers to #6 |  |
| [1]: (9, 1), #6 | [1]: refers to #9 |  |

In this example, assume that the current picture being encoded is #8 in display order. The List 0 motion vectors from the left, above, and above-right blocks are used as input to a median filter to generate the prediction for the List 0 motion vector in the current block. The resulting median motion vector is equal to (5, 0), which is the component-wise median of (12, 0), (5, 0), and (5, 2). The List 1 motion vectors from the left, above, and above-right blocks are used as input to a median filter to generate the prediction for the List 1 motion vector in the current block. The resulting median motion vector is equal to (−6, −1), which is the component-wise median of (9, 1), (−6, −1), and (−8, −3).

Compared to the prior art, the method of deriving motion vector predictions described in the present invention requires greatly reduced complexity, while providing the identical or a similar prediction result in many of the cases that occur in a typical video encoder. Since the prediction is always derived from the same list and the reference picture selection has no influence on the prediction, there is no need to evaluate several conditions in order to select each neighbouring vector, as in the prior art. Further, no complex division operations are required, as in the scaled motion vector case of the prior art. Finally, since the prediction of motion vectors in each list is independent of the other list, it is possible to compute all of the motion vectors for one list before computing any of the motion vectors in the other list.

Although the invention has been described with reference to certain specific embodiments, various modifications thereof will be apparent to those skilled in the art without departing from the spirit and scope of the invention as outlined in the claims appended hereto.

The invention claimed is:

1. A method for predicting motion vectors associated with blocks of pixels of a picture to be included in a data stream for differential motion vector coding of a video signal, said method comprising the steps of:

organising a set of reference pictures into a pair of lists and according to each reference picture within said lists at least one reference index;

associating with selected ones of said blocks in said video signal at least one motion vector that references a respective one of said lists, each vector associated with a selected one of the blocks referencing a different list of said lists, each vector defining disposition of said selected one of the blocks relative to a reference picture in the respective one of said lists; and, computing a predicted value for a current vector of said vectors for a current block from vectors of adjacent blocks referencing a same list of reference pictures as the current vector, wherein prediction of a motion vector that selects a reference picture using a first list of reference pictures is not dependent upon motion vectors whose reference pictures are selected using a second list of reference pictures.

2. The method of claim 1 wherein said computing uses values of spatially neighbouring motion vectors that use the same list of reference pictures as the current vector regardless of relative temporal direction of reference pictures selected for the current vector and neighbouring motion vectors.

3. The method of claim 1 wherein the motion vector coding supports a plurality of block partition sizes for performing motion compensation.

4. The method of claim 3 wherein the block partition sizes include partitions of 16×16, 16×8, 8×16, 8×8, 8×4, 4×8, and 4×4 luminance samples.

5. The method of claim 1 wherein said motion vectors may be computed using one of a plurality of predefined computation strategies.

6. The method of claim 5 wherein a first strategy of said strategies uses a vector from a single neighbouring block that uses the same list as the current vector.

7. The method of claim 6 wherein said first strategy is applied only when a block partition size of the current block for the current vector is 16×8 or 8×16 luminance samples.

8. The method of claim 7 wherein if the current vector applies to atop half of a 16×8 partitioned macroblock and a block immediately above the current block in the picture contains a vector that uses the same reference picture list and reference index×as the current vector, the current vector is set equal to the vector that uses the same reference picture list in the block immediately above.

9. The method of claim 7 wherein if the current vector applies to a bottom half of a 16×8 partitioned macroblock and a block immediately left of the current block contains a vector that uses the same reference picture list and reference index as the current vector, the current vector is set equal to the vector that uses the same reference picture list in the block immediately left of the current block.

10. The method of claim 7 wherein if the current vector applies to a left half of an 8×16 partitioned macroblock and a block immediately left contains a vector that uses the same reference picture list and reference index as the current vector, the current vector is set equal to the vector that uses the same reference picture list in the block immediately left.

11. The method of claim 7 wherein if the current vector applies to a right half of an 8×16 partitioned macroblock, and a block above and to the right of the current block is available, and the above and to the right block contains a vector that uses the same reference picture list and reference index as the current vector, the current vector is set equal to the vector that uses the same reference picture list in the block above and to the right of the current block.

12. The method of claim 7 wherein if the current vector applies to a right half of an 8×16 partitioned macroblock, and a block immediately above and to the right is not available but a block above and to the left is available, and the block above and to the left contains a vector that uses the same reference picture list and reference index as the current vector, the current vector is set equal to the vector that uses the same reference picture list in the block above and to the left.

13. The method of claim 5 wherein a second strategy selects vectors from up to three neighbouring blocks.

14. The method of claim 13 wherein said three neighbouring blocks are a block to the left of the current block, a block above the current block, and a block above and to the right of the current block.

15. The method of claim 14 wherein if the block above and to the right is not available then the block above and to the left is used, if available.

16. The method of claim 13 wherein if no vector using the same reference picture list is available in one of said three neighbouring blocks, a zero-valued motion vector, (0,0), is used in place of a vector from one of said three neighbouring blocks.

17. The method of claim 13 wherein if blocks above, above and to the left, and above and to the right of the current block are not available within a same picture or slice as the current block, and a block to the left of the current block is available, the current vector is set equal to a vector used for the block to the left of the current block.

18. The method of claim 13 wherein if a left block is an only available block of the three neighbouring blocks, and if one and only one of the three neighbouring blocks contains a vector that uses the same reference picture list as the current block and uses a reference index equal to the reference index used for the current block, the current vector is set equal to the value of said vector.

19. The method of claim 13 wherein if the current vector has not been computed according to either of claims 17 or claim 18 then the current vector is computed by taking a component-wise median of three neighbouring vectors.

20. The method of claim 19 wherein if no vector using the same reference picture list is available in one of said three neighbouring blocks, a zero-valued motion vector, (0,0), is used in place of a vector from one of said three neighbouring blocks.

* * * * *